US 9,875,066 B2

(12) United States Patent
Goyal et al.

(10) Patent No.: US 9,875,066 B2
(45) Date of Patent: Jan. 23, 2018

(54) SINGLE ACTION PRINT APPLICATION CREATION

(75) Inventors: Anurag Goyal, Karnataka (IN); Raj Anand, Karnataka (IN); Venugopal K. S., Karnataka (IN)

(73) Assignee: Hewlett-Packard Development Company, L. P., Houston, TX (US)

( * ) Notice: Subject to any disclaimer, the term of this patent is extended or adjusted under 35 U.S.C. 154(b) by 695 days.

(21) Appl. No.: 13/455,896

(22) Filed: Apr. 25, 2012

(65) Prior Publication Data

US 2013/0286429 A1 Oct. 31, 2013

(51) Int. Cl.
*G06F 3/12* (2006.01)
*G06K 15/02* (2006.01)
*G06F 3/00* (2006.01)

(52) U.S. Cl.
CPC ............ G06F 3/1204 (2013.01); G06F 3/123 (2013.01); G06F 3/1271 (2013.01); G06F 3/1289 (2013.01); *G06F 3/1205* (2013.01); *G06F 3/1225* (2013.01)

(58) Field of Classification Search
CPC ...... G06F 3/123; G06F 3/1271; G06F 3/1204; G06F 3/1289; G06F 3/1225; G06F 3/1205
USPC ........................................... 358/1.15; 715/76
See application file for complete search history.

(56) References Cited

U.S. PATENT DOCUMENTS

| | | | | |
|---|---|---|---|---|
| 5,469,533 A * | 11/1995 | Dennis | ................. | G06F 3/1296 358/1.11 |
| 6,009,410 A * | 12/1999 | LeMole | ................. | G06Q 30/02 705/14.54 |
| 6,184,996 B1 * | 2/2001 | Gase | ...................... | G06F 3/1294 358/1.15 |
| 7,573,604 B2 * | 8/2009 | Hull | ................... | G06F 17/30017 235/462.01 |
| 7,970,781 B1 * | 6/2011 | King | .................... | G06Q 30/018 705/27.1 |
| 8,582,154 B2 * | 11/2013 | Uchida | .............. | H04N 1/00244 358/1.15 |
| 2002/0135800 A1 * | 9/2002 | Dutta | .................... | G06F 3/1219 358/1.15 |
| 2004/0066531 A1 * | 4/2004 | Kim | .................. | G06F 17/30876 358/1.15 |
| 2004/0205493 A1 * | 10/2004 | Simpson | ........... | G06F 17/30899 715/205 |
| 2005/0273445 A1 * | 12/2005 | Steelberg | ............... | G06Q 30/02 705/80 |
| 2007/0027932 A1 * | 2/2007 | Thibeault | ............ | G06F 17/3089 |
| 2007/0264985 A1 * | 11/2007 | Kapur | ....................... | G06F 8/38 455/414.1 |

(Continued)

*Primary Examiner* — Edwin S Leland, III
(74) *Attorney, Agent, or Firm* — FabianVanCott (57) ABSTRACT

A method of creating a print application by a single action comprises appending a print application creation button to a browser instance displayed on a user device, receiving a single action user input on the user device to add content displayed in the browser instance as a print application, and creating the print application based on the content. A system for creating a print application comprises a user device communicatively coupled to a server, the user device comprising a processor, a data storage device, and a native print application to display a print application creation button in association with content displayed in a browser instance and obtain data related to the content displayed in the browser instance.

19 Claims, 9 Drawing Sheets

(56) References Cited

U.S. PATENT DOCUMENTS

| | | | |
|---|---|---|---|
| 2008/0086511 A1* | 4/2008 | Takao | G06F 17/30265 |
| 2008/0282198 A1* | 11/2008 | Brooks | G06Q 10/10 |
| | | | 715/854 |
| 2009/0086239 A1* | 4/2009 | Selvaraj | G06F 3/1211 |
| | | | 358/1.13 |
| 2009/0241135 A1* | 9/2009 | Wong | G06F 9/4443 |
| | | | 719/328 |
| 2009/0287674 A1* | 11/2009 | Bouillet | G06F 17/30884 |
| 2009/0323118 A1* | 12/2009 | Kil | G06F 3/1222 |
| | | | 358/1.15 |
| 2010/0174974 A1* | 7/2010 | Brisebois | G06F 17/243 |
| | | | 715/223 |
| 2010/0225955 A1* | 9/2010 | Almen | G06Q 30/02 |
| | | | 358/1.15 |
| 2010/0309512 A1* | 12/2010 | Onoda | G06F 3/0482 |
| | | | 358/1.15 |
| 2011/0113090 A1* | 5/2011 | Peeri | G06F 9/4443 |
| | | | 709/203 |
| 2011/0145908 A1* | 6/2011 | Ting | G06F 21/32 |
| | | | 726/7 |
| 2011/0276805 A1* | 11/2011 | Nagpal | G06F 21/51 |
| | | | 713/189 |
| 2011/0310431 A1* | 12/2011 | Uchikawa | H04N 1/00411 |
| | | | 358/1.15 |
| 2012/0010995 A1* | 1/2012 | Skirpa | G06F 3/0481 |
| | | | 705/14.49 |
| 2012/0050793 A1* | 3/2012 | Miyazawa | G06F 3/1206 |
| | | | 358/1.15 |
| 2012/0050799 A1* | 3/2012 | Towata | G06F 3/122 |
| | | | 358/1.15 |
| 2012/0081746 A1* | 4/2012 | Yamaguchi | G06F 3/1207 |
| | | | 358/1.15 |
| 2012/0159356 A1* | 6/2012 | Steelberg | G06F 17/30861 |
| | | | 715/760 |
| 2012/0182573 A1* | 7/2012 | Mok | G06F 3/1204 |
| | | | 358/1.15 |
| 2012/0194851 A1* | 8/2012 | Srinivasmurthy | G06F 3/1204 |
| | | | 358/1.15 |
| 2012/0218599 A1* | 8/2012 | Kashioka | G06F 3/1222 |
| | | | 358/1.15 |
| 2012/0268769 A1* | 10/2012 | Kashioka | G06F 3/1204 |
| | | | 358/1.14 |
| 2013/0010324 A1* | 1/2013 | Towata | G06F 3/122 |
| | | | 358/1.15 |
| 2013/0021638 A1* | 1/2013 | Hong | G06F 3/1204 |
| | | | 358/1.14 |
| 2013/0033722 A1* | 2/2013 | Kamath | G06K 15/02 |
| | | | 358/1.15 |
| 2013/0107311 A1* | 5/2013 | Eng | G06F 3/122 |
| | | | 358/1.15 |
| 2013/0141747 A1* | 6/2013 | Oba | G06F 3/1292 |
| | | | 358/1.14 |
| 2013/0222843 A1* | 8/2013 | Ganesan | G06F 3/1204 |
| | | | 358/1.15 |
| 2013/0286429 A1* | 10/2013 | Goyal | G06F 3/123 |
| | | | 358/1.15 |

* cited by examiner

SINGLE ACTION PRINT APPLICATION CREATION

BACKGROUND

Print-application-enabled printers are an emerging technology. Print applications are applications available for download to an internet-connected printer, and provide users with instant access to relevant, printable web content from the printer's control panel. By using a printer application, users can browse and print online printable content directly on the printer without the use of a computing device to deliver the content to the printer.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

It may be difficult for users to create print applications for use on their respective printing devices. It may take much more technical training than a layperson may have to create such a print application. The present application discloses print application creation methods by a single action such as a click of a mouse by a user. The present print application creation may be used on a wide variety of devices. The present system and methods result in the creation, registration, and display of the print application on a user's printing device. The print applications can also be personalized, merged, removed, and managed by a single click.

As used in the present specification and in the appended claims, the term "print application," "print app" or similar language is meant to be understood broadly as any application associated with the printing of content available on a network. In one example, the print application may print content available as printable content on a third-party webpage such as, for example, text, photos, and graphics into formatted printed pages.

As used in the present specification and in the appended claims, the term "user device" is meant to be understood broadly as any combination of an operating system and hardware that makes up the operating environment in which a program runs on that user device. The operating systems used in such user devices may include, for example, ANDROID® mobile phone operating system, WINDOWS® operating systems developed and owned by Microsoft, iOS® mobile phone operating system developed and owned by Apple, Inc., WebOS® mobile operating system owned by Hewlett-Packard, UNIX®-based operating systems, and LINUX®-based operating systems, among others. The hardware of the user device may comprise any computing device including, for example, a mobile phone, a personal digital assistant (PDA), a tablet computer, a laptop computer, and a desktop computer, among others.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
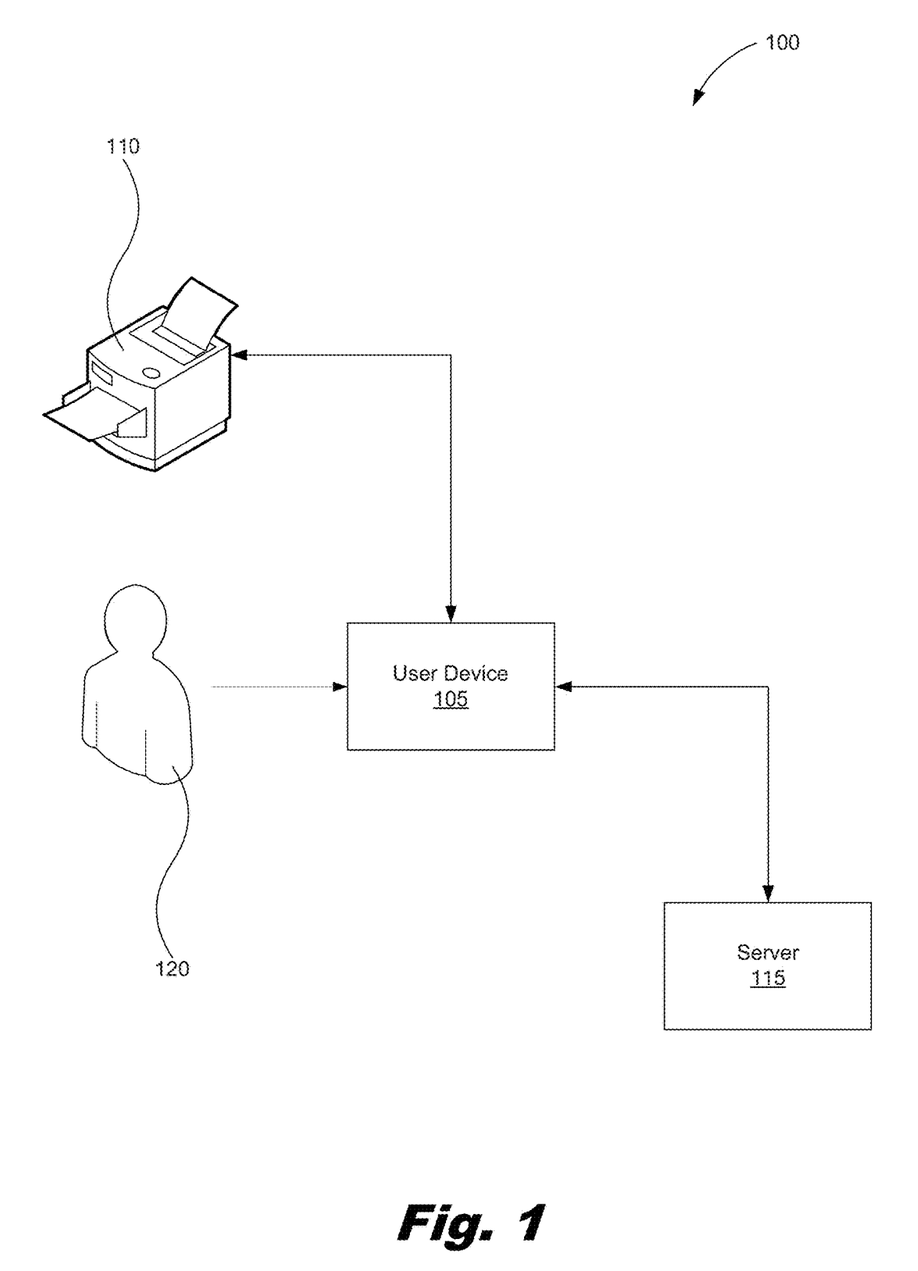
FIG. 1 is a diagram of a system for print application creation, according to one example of the principles described herein.

FIG. 1 is a diagram of a system (100) for print application creation, according to one example of the principles described herein. The system may comprise a user device (105). A user device (105), as described above, may comprise any number of computing devices and their associated operating systems. However, throughout the present disclosure, the user device (105) is described in the context of being a mobile phone or desktop computing device.

The system (100) further comprises a printing device (110) communicatively coupled to the user device (105) through a wired or wireless communication path. The printing device (110) is a print-application-enabled printing device. A print-application-enabled printing device is any printing device that can receive print applications from a source and reproduce printable content available on a network such as the Internet.

The system (100) of FIG. 1 further comprises a server (115). In one example, the server (115) is the source from which the print application is obtained, the source of the printable content available on a network, or a combination of both. In one example, the server (115) may comprise an application server that provides services to users. For example, the server (115) may be a server utilized by ePrint Center located at https://h30495.www3.hp.com and operated by Hewlett-Packard Development Company, L.P. In one example, the server (115) utilizes Simple Internet Print (SIP) SIPS Basic Service (SBS) platform.

In the present example, for the purposes of simplicity in illustration, the user device (105), the printing device (110), and the server (115) are separate devices communicatively coupled to each other. However, the principles set forth in the present specification extend equally to any alternative configuration in which the user device (105), the printing device (110), and the server (115) are configured as one device, or two devices with one device comprising one of these devices, and the other device comprising two of these devices. As such, alternative examples within the scope of the principles of the present specification include, but are not limited to, examples in which the user device (105), the printing device (110), and the server (115) are implemented by the same computing device, examples in which the functionality of the user device (105) is implemented by multiple interconnected computers, for example, a server in a data center and a user's (120) client machine, and examples in which the user device (105), the printing device (110), and the server (115) communicate directly through a bus without intermediary network devices. Each of the user device (105), printing device (110), and server (115) will now be described in more detail in connection with FIGS. 2 through 4.

Figure 2:
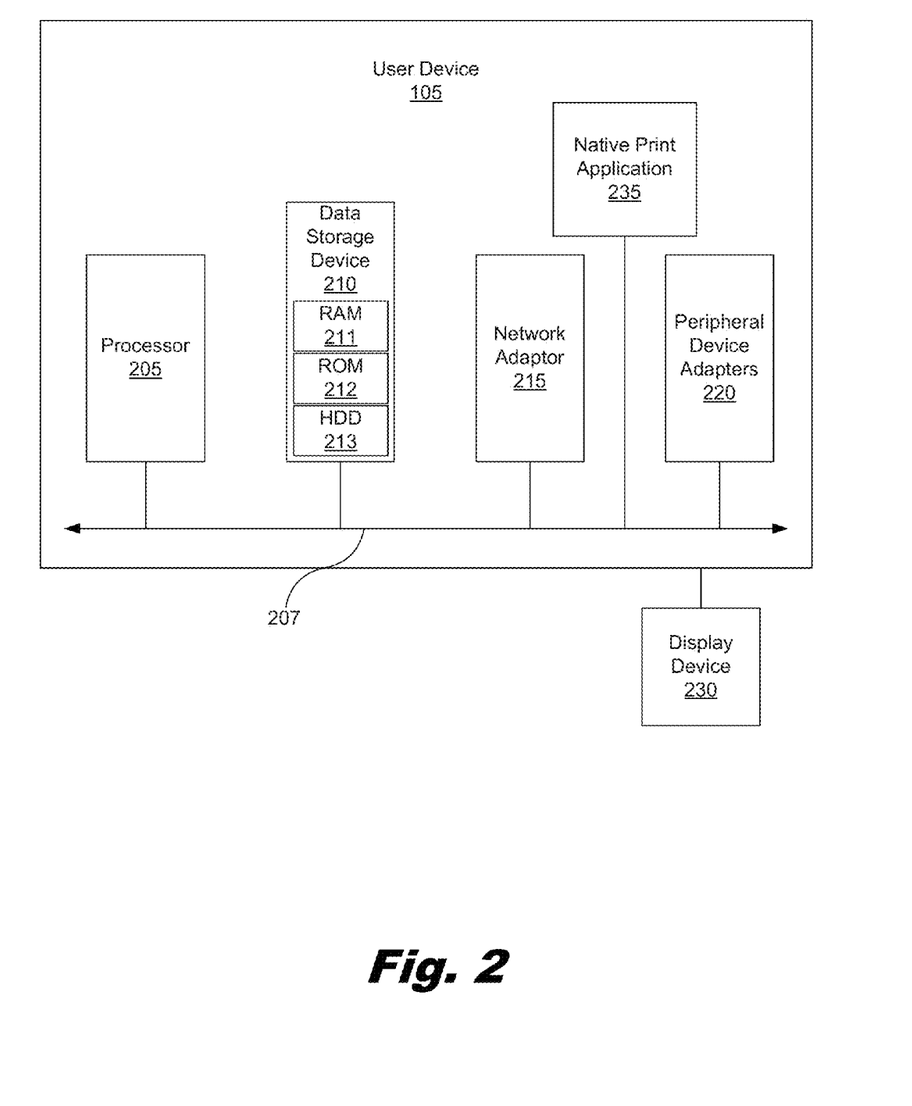
FIG. 2 is a diagram of the user device of FIG. 1, according to one example of the principles described herein.

FIG. 2 is a diagram of the user device (105) of FIG. 1, according to one example of the principles described herein. To achieve its desired functionality, the user device (105) comprises various hardware components. These hardware components may include, for example, a processor (205), a data storage device (210), a network adaptor (215), and peripheral device adapters (220), among others. These hardware components may be interconnected through the use of a number of busses and/or network connections. In one example, the processor (205), data storage device (210), network adaptor (215), and peripheral device adapters (220) are communicatively coupled via bus (207).

The processor (205) may include the hardware architecture for retrieving executable code from the data storage device (210) and executing the executable code. The executable code, when executed by the processor (205), causes the processor (205) to implement at least the functionality of installing a native print application (235) on the user device (105), creating a network account associated with the native print application (235), and capturing data about the content of the webpage displayed on the user device (105) such as, for example the URL, metadata associated with the country and language utilized by the user device (105), thumbnails, printable content, icons, and other data associated with the printable content in response to a user's (120) one-click selection of the content. The executable code, when executed by the processor (205), causes the processor (205) to also implement the functionality of requesting the creation of a print application based on content data, as described herein. In the course of executing code, the processor (205) may receive input from and provide output to a number of the remaining hardware units. In one example, the user device (105) may further comprise a display device (230) for displaying user (120) interactive text and images as will be described in more detail below.

Figure 3:
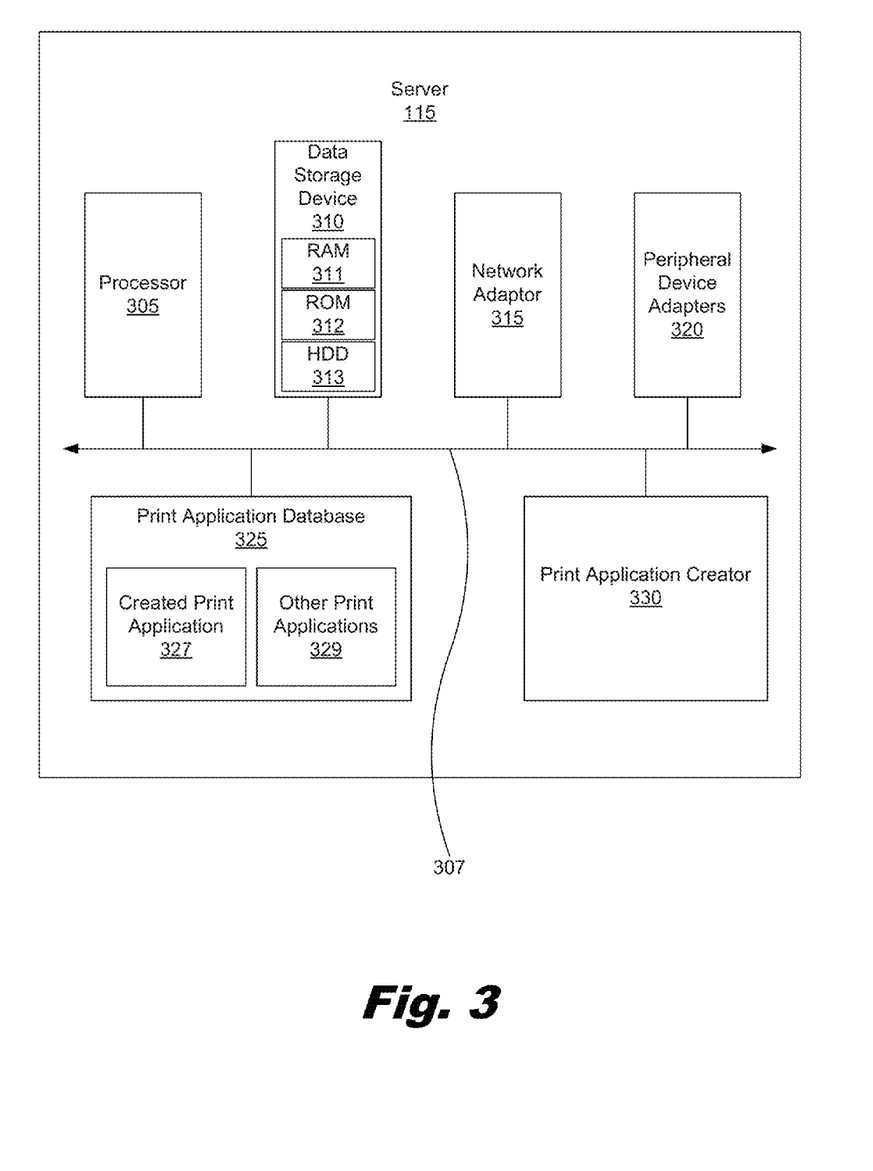
FIG. 3 is a diagram of the server of FIG. 1, according to one example of the principles described herein.

FIG. 3 is a diagram of the server (115) of FIG. 1, according to one example of the principles described herein. To achieve its desired functionality, the server (115) comprises various hardware components. These hardware components may include, for example, a processor (305), a data storage device (310), a network adaptor (315), peripheral device adapters (320), a print application database (325), and a print application creator (330), among others. These hardware components may be interconnected through the use of a number of busses and/or network connections. In one example, the processor (305), data storage device (310), network adaptor (315), peripheral device adapters (320), print application database (325), and print application creator (330) are communicatively coupled via bus (307).

The processor (305) may include the hardware architecture for retrieving executable code from the data storage device (310) and executing the executable code. The executable code, when executed by the processor (305), causes the processor (305) to implement at least the functionality of transmitting a native print application (235) to the user device (105), creating a network account associated with the native print application (235) and the user device (105), transmitting content to the user device (105) available on a network such as, for example, the Internet, creating an print application associated with the content upon a single action of the user (120) such as, for example, a single click of a mouse, and enabling the print application on the printing device (110) as described herein. In the course of executing code, the processor (305) may receive input from and provide output to a number of the remaining hardware units.

The print application database (325) of the server (115) stores a number of print applications (327, 329) including a created print application (327) and a number of other print applications that may have been created previously. Although depicted and described here as being part of the server (115), the application database (325) may be stored within the user device (105) or printing device (110). Further, the content associated with the print applications (327, 329) may be stored, or may be acquired from the number of web pages associated with the print applications (327, 329).

The server (115) further comprises a print application creator (330). The print application creator (330) creates the print applications (327, 329) associated with the content displayed on the user device (105) upon a single action of the user (120) such as, for example, a single click of a mouse. The process by which the print application creator (330) creates print applications will be described in more detail below. Although depicted and described here as being part of the server (115), the print application creator (330) may be stored within or exist on the user device (105) or printing device (110).

In one example, the server (115) may comprise an application server that provides services to users. For example, the server (115) may be a server utilized by ePrint Center located at https://h30495.www3.hp.com and operated by Hewlett-Packard Development Company, L.P. In one example, the server (115) utilizes a service-oriented architecture (SOA).

Figure 4:
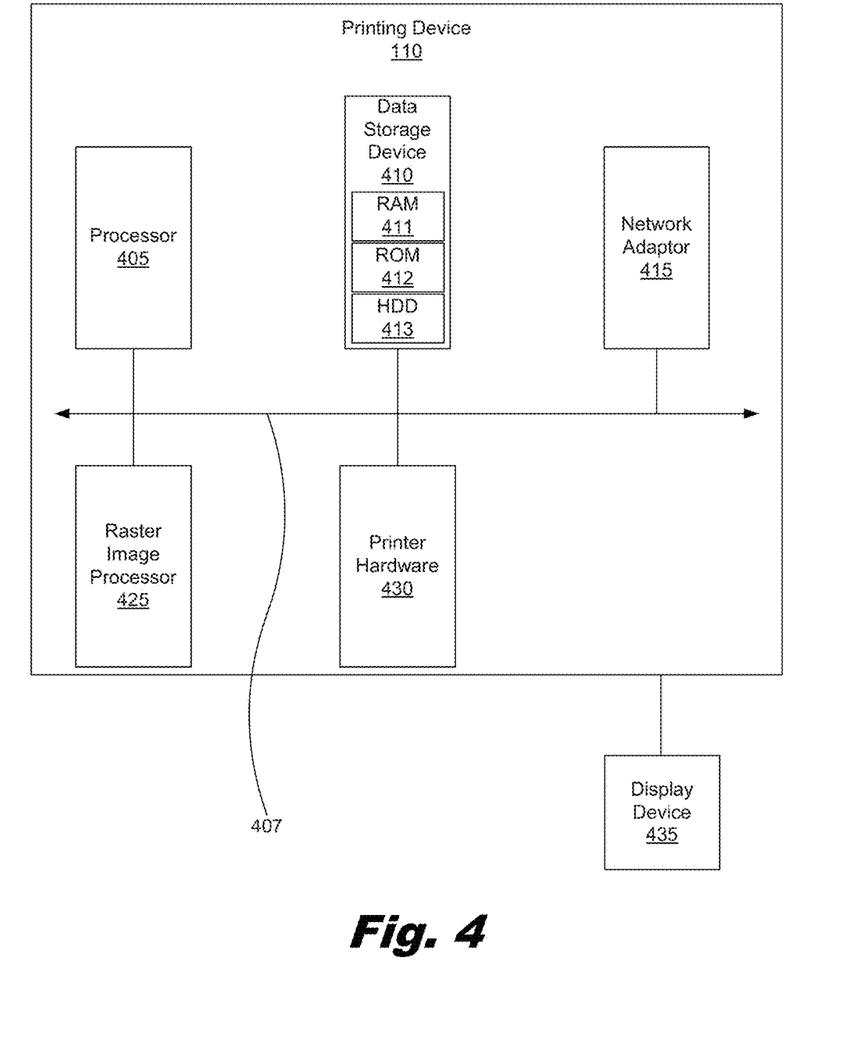
FIG. 4 is a diagram of the printing device of FIG. 1, according to one example of the principles described herein.

FIG. 4 is a diagram of the printing device (110) of FIG. 1, according to one example of the principles described herein. To achieve its desired functionality, the printing device (110) comprises various hardware components. These hardware components may include, for example, a processor (405), a data storage device (410), a network adaptor (415), a raster image processor (RIP) (425), printer hardware (430), and a display device (435), among others. These hardware components may be interconnected through the use of a number of busses and/or network connections. In one example, the processor (405), data storage device (410), network adaptor (415), raster image processor (RIP) (425), printer hardware (425), and display device (430) are communicatively coupled via bus (407).

The processor (405) may include the hardware architecture for retrieving executable code from the data storage device (410) and executing the executable code. The executable code, when executed by the processor (405), causes the processor (405) to implement at least the functionality of receiving a number of print applications from the user device (105) or server (115), displaying representations of the print applications on the display device (435), and creating hard copies of the content included within the print application via the RIP (425) and printer hardware (430), as described herein. In the course of executing code, the processor (405) may receive input from and provide output to a number of the remaining hardware units. The RIP (425) and printer hardware (430) of the printing device (110) produce hard copies of the content included within the print application. In one example, the processor (405) performs the functions of the RIP (425). In either example, the processor (405) or RIP (425) interprets supported page description languages (PDLs), renders the interpretation as a continuous tone bitmap, and screens the continuous-tone bitmap by converting it into a halftone. The printer hardware (430) comprises any number of hardware and electrical devices used to physically create the hardcopy of the desired printable content.

The display device (435) of the printing device (110) displays a user interface that allows a user (120) to select a print application (327, 329) for printing of the content associated with the print application (327, 329). In one example, the display device (435) is a touch screen device where a user can select elements such as the print applications (327, 329) by touching a representation of the print applications (327, 329) presented on the display device (435).

The data storage devices (210, 310, 410) of the user device (105), printing device (110), and server (115) may store data such as executable code. This executable code is processed and produced by the processors (205, 305, 405, 425). The data storage devices (210, 310, 410) may include various types of memory devices, including volatile and nonvolatile memory. For example, the data storage devices (210, 310, 410) of the present example may include Random Access Memory (RAM) (211, 311, 411), Read Only Memory (ROM) (212, 312, 412), and Hard Disk Drive (HDD) memory (213, 313, 413), among others. The present specification contemplates the use of many varying type(s) of memory in the data storage device (210) as may suit a particular application of the principles described herein. In certain examples, different types of memory in the data storage device (210) may be used for different data storage needs. In certain examples, the processor (205) may boot from the Read Only Memory (ROM) (212), maintain non-volatile storage in the Hard Disk Drive (HDD) memory (213), and execute program code stored in Random Access Memory (RAM) (211).

Generally, the data storage devices (210, 310, 410) may comprise a computer readable storage medium. For example, the data storage devices (210, 310, 410) may be, but not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing, among others. In the context of this document, a computer readable storage medium may be any tangible medium that can contain, or store a program for use by or in connection with an instruction execution system, apparatus, or device.

The network adaptors (215, 315, 415) of the user device (105), printing device (110), and server (115) provide the user device (105), printing device (110), and server (115) with connectivity to a network. Thus, the user device (105), printing device (110), and server (115) are able to communicate with the each other via the network adaptors (215, 315, 415). The network adaptors (215, 315, 415) may employ a data link layer standard such as, for example, Ethernet or Wi-Fi, among others, in order to transfer data using wired communications, wireless communications, or a combination thereof.

The peripheral device adapters (220, 320) of the user device (105) and server (115) enable the processors (205, 305) of the user device (105) and server (115), respectively, to interface with various other hardware elements, external and internal to the user device (105) and server (115). For example, peripheral device adapters (220, 320) may provide an interface to input/output devices, such as, for example, the display device (230), the printing device (110), an external storage device, a keyboard, touch screen displays, and a mouse, among others, to create a user interface and/or access external sources of memory storage, for example.

Figure 5:
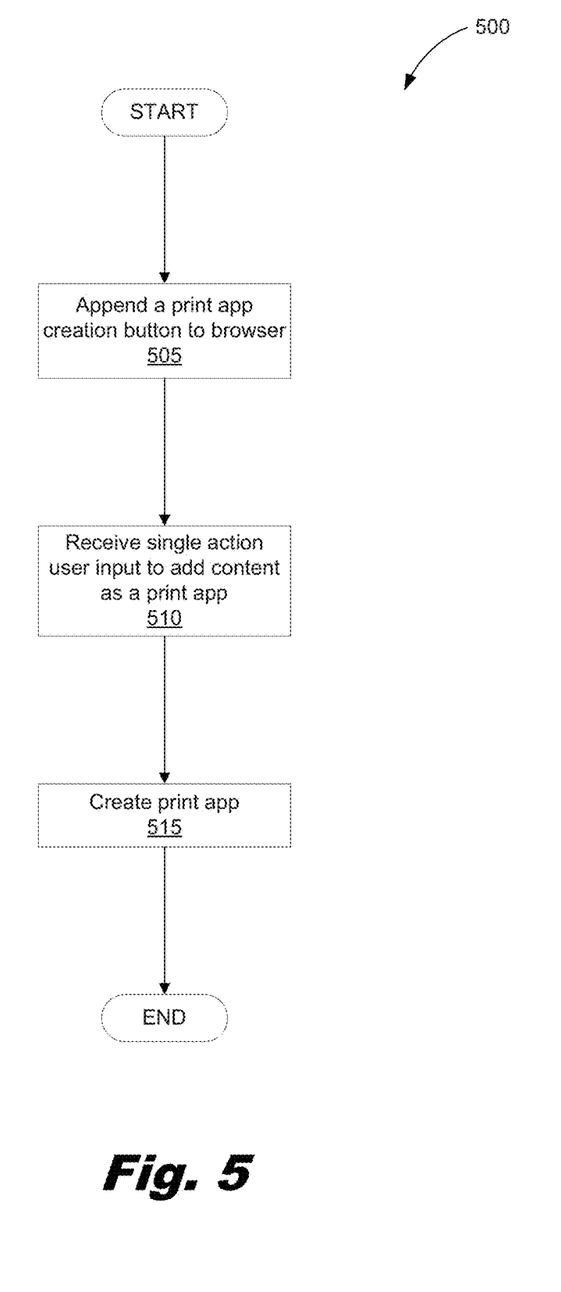
FIG. 5 is a flowchart showing a print application creation method, according to one example of the principles described herein.
Figure 6:
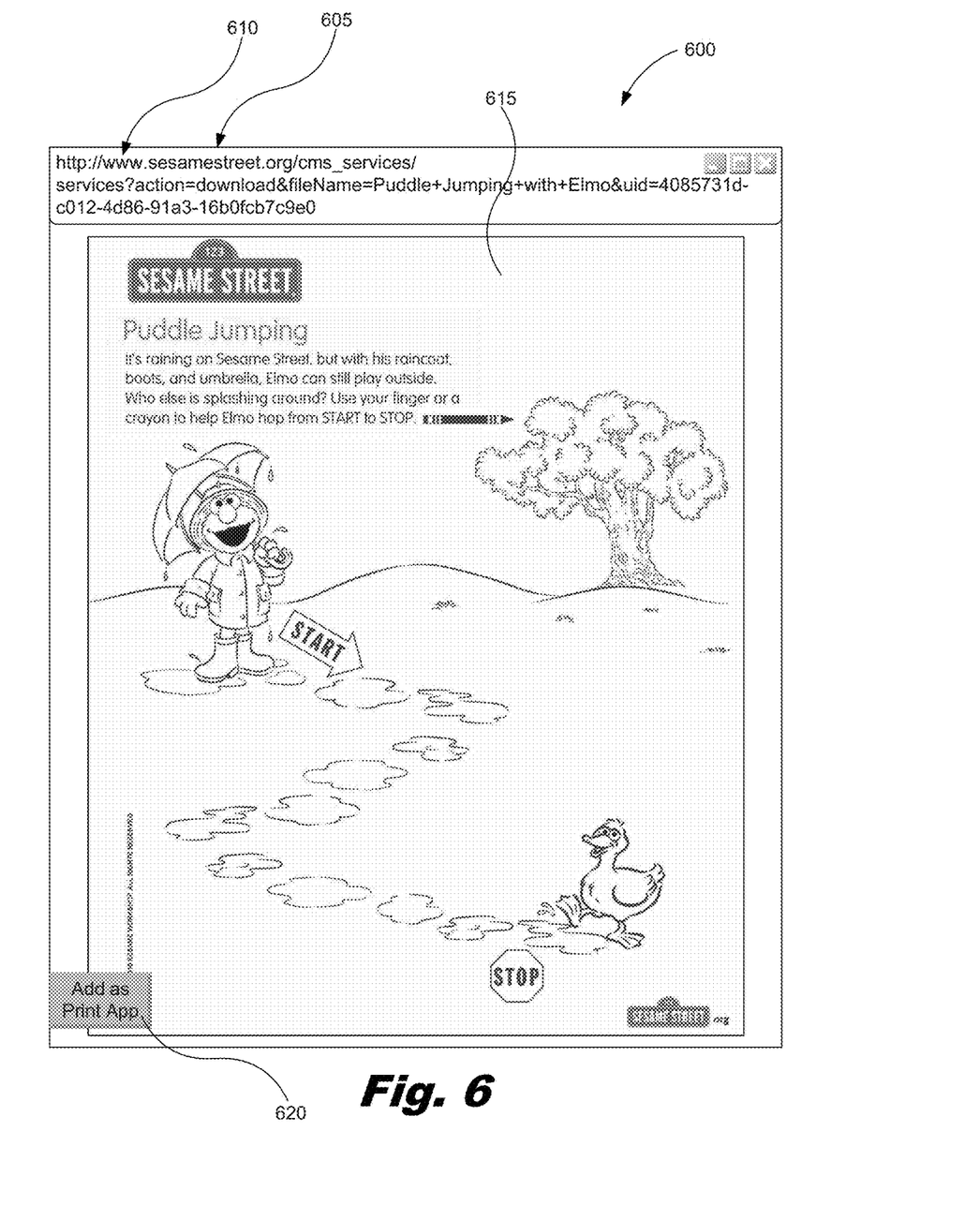
FIG. 6 is a screen shot of a browser presented on a user device including a print application creation button, according to an example of the principles described herein.
Figure 9:
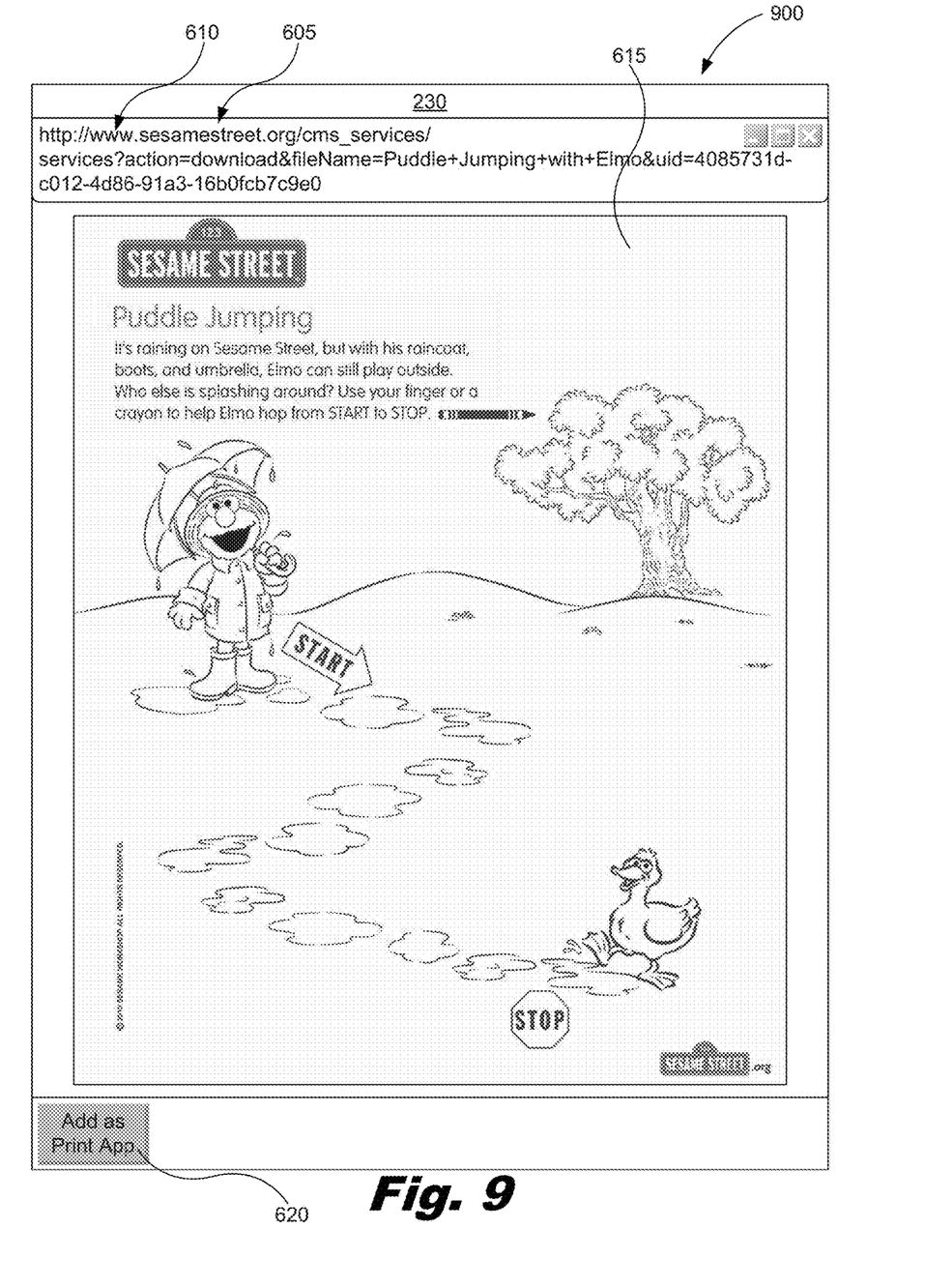
FIG. 9 is a screen shot of a browser presented on a user device including a print application creation button, according to another example of the principles described herein.

Having described the various devices within the system (100) for print application creation, FIG. 5 is a flowchart showing a print application creation method (500), according to one example of the principles described herein. FIG. 6 is a screen shot (600) of browser (505) presented on a user device (105) including a print application creation button (620), according to an example of the principles described herein. FIG. 9 is a screen shot (900) of a browser (605) presented on a user device (105) including a print application creation button (620), according to another example of the principles described herein. The method of FIG. 5 may begin by appending (block 505) a print application creation button (FIG. 6, 620) via the native print application (235) to a browser (605). The browser (605) may comprise a URL pane (610) indicating the URL at which the user is viewing via the browser (605). The browser (605) also comprises content (615). As described above, the content (615) may include any printable content such as, for example, text, photos, and graphics. In the examples of FIGS. 6, and 9 the content is a children's coloring page.

The print application creation (620) may be appended to or included in any portion of the browser (605) or its functions such as, for example, a toolbar or menu. In another example, the print application creation button (620) may be appended to or included in a portion of the browser (605) not associated with a function of the browser (605). In another example, the print application creation button (620) may be appended to or included in a portion of the display device (230) of the user device (105) not associated with the browser (605) depicted in, for example, FIG. 9.

Turning again to FIG. 5, the server (115) receives (block 510) a single action user input from the user's device (105) instructing the addition of the content the user (120) is viewing in the browser (605) as a print application. As described above, the single action by the user (120) is the selection of the print application creation button (620). The selection of the print application creation button (620) by the user and receipt (block 510) of those instructions causes the server (115) to create (block 515) a print application in connection with the content being viewed by the user (120).

Figure 7:
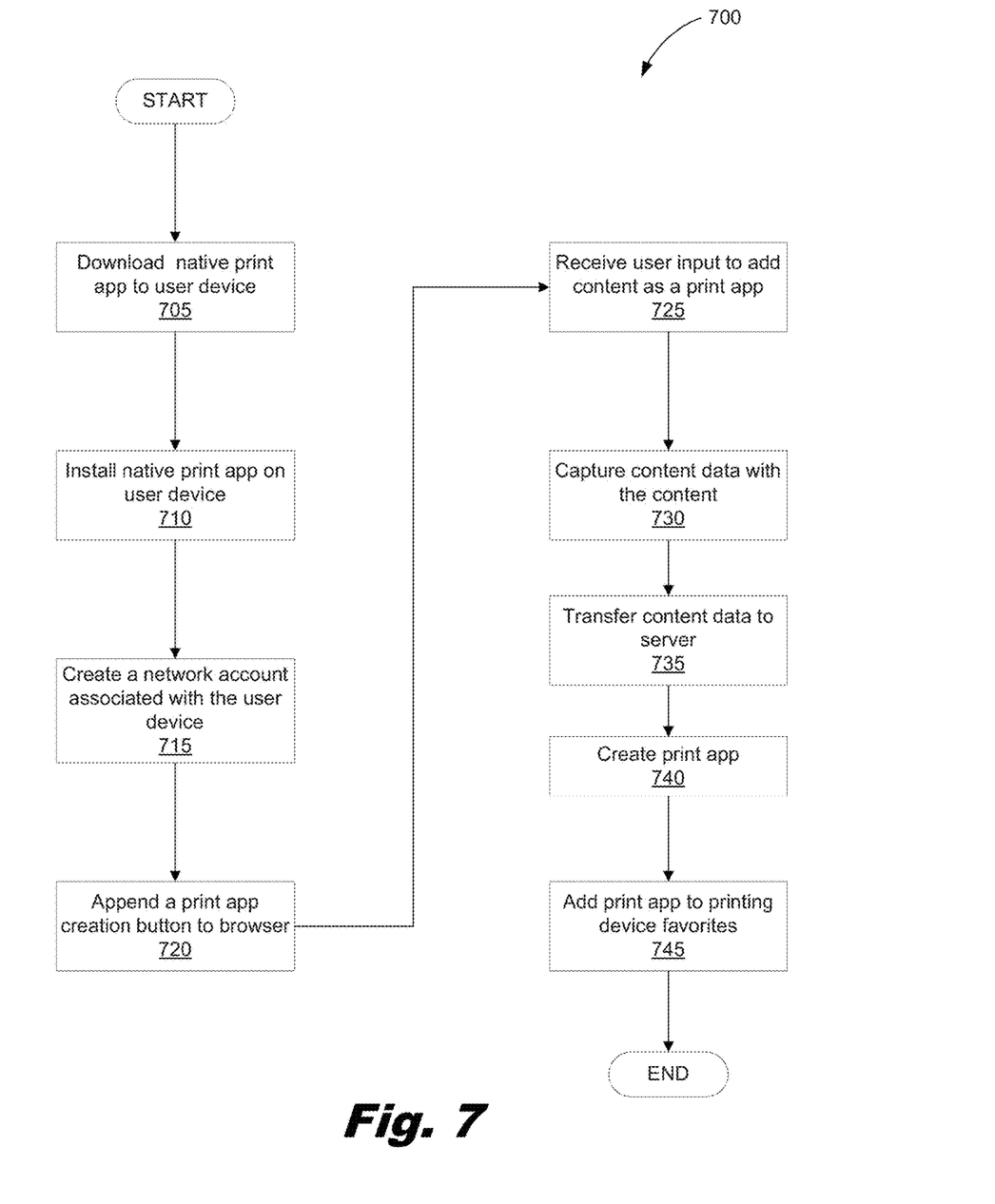
FIG. 7 is a flowchart showing a print application creation and deployment method, according to one example of the principles described herein.

FIG. 7 is a flowchart showing a print application creation and deployment method (700), according to one example of the principles described herein. The method of FIG. 7 may begin by downloading (block 705) a native print application (235) to the user device (105). In one example, the native print application (235) is obtained from the server (115) or other source. The native print application (235) is installed (block 710) on the user device (105).

In one example, the native print application (235) is executed on a user device (105) that is a desktop computing device or similar computing device. In this example, the native print application (235) is a browser plug-in that is a set of software components that adds the ability to create print applications within the browser (605). The plug-in displays the print application creation button (620) in association with the browser (605). This plug-in may be supported by any number of browsers including, for example, the FIREFOX® browser developed and owned by Mozilla Corp., the CHROME browser developed and owned by Google, Inc., INTERNET EXPLORER® browser developed and owned by Microsoft Corporation, and SAFARI® browser developed and owned by Apple Inc., among others.

In another example, the native print application (235) is executed on a user device (105) that is a mobile device such as, for example, a smartphone. In this example, because plug-ins may be difficult to incorporate into the browsers of mobile devices, the native print application (235) is presented as a separate application on the mobile device. If the user opens the mobile device's web browser or another application that provides online content, the native print application (235), running as a separate application on the mobile device, is presented in association with the mobile device's web browser or other content-displaying application.

As another example of the native print application (235) executed on a mobile device such as a smartphone, the native print application (235) may be used as the browser (605) to access a URL. In this example, the native print application (235), when executed on the smartphone, can download and present content.

Once the native print application (235) is installed (block 710) on the user device (105), a network account associated with the user device (205) may be created (block 715). Creation of a network account allows the to-be-created print application to be associated with the user (120), the user device (105), and the printing device (110). The native print application (235) installed on the user device (105) then appends (block 720) a print application creation button to browser (605) that the user (120) utilizes in a network browsing session. In one example, the appended print application creation button may appear on the display device (230) of the user device (105) as a print application creation button (620) indicating an "Add as a Print App" function as shown in FIG. 6 and described above in connection with the method (500) of FIG. 5.

The user device (105) and server (115) receive (block 725) user input to add the content currently being viewed in the browsing session as a print application to the user's (120) printing device (110). This user input is accomplished by one action by the user such as a click of the mouse on the print application creation button (FIG. 6, 620).

The native print application (235) of user device (105) captures (block 730) data about the content of the webpage displayed on the user device (105) such as, for example the URL, metadata associated with the country and language utilized by the user device (105), thumbnails, printable content, icons, and other data associated with the printable content. This content data is transferred (block 735) to the server (115).

In one example, the content data is transferred (block 735) from the user device (105) to the server (115) in extensible markup language (XML) format. Placing the content data in XML format allows a user with no knowledge of programming languages to create print applications. These programming languages may include, for example, JAVA® programming language developed and owned by Oracle Corporation, and .NET programming language developed and owned by Microsoft Corporation, among others. This, in turn, makes it possible for laypersons to create print applications because the layperson does not interact with the programming language since the system (100) autonomously creates the print applications with no user intervention or interaction with the programming language.

The server (115), after receiving the content data, creates (block 740) the print application using the print application creator (330). The print application creator (330) may be any combination of hardware and software that combines the content data in a format such as, for example, XML format, to form the print application (327, 329). In one example, the print application creator (330) utilizes simple internet print (SIP) protocol used by the Hewlett-Packard's App Builder application creation program. In this example, data feeds such as, for example, really simple syndication (RSS) feeds are acquired from the URL currently viewed by the user (120) on the user device (105). This RSS feed is combined with a user interface and screen navigation for the print application (327, 329).

In the above examples, the RSS feeds utilized in creating the print applications (327, 329) may be created, stored, and published by a third party other than the service provider associated with the print application creator (330) of the server (115). In another example, the RSS feeds utilized in creating the print applications (327, 329) may be created, stored, and published by the service provider associated with the print application creator (330) of the server (115). In this example, the service provider may be Hewlett Packard, who would use the ePrint Center located at https://h30495.www3.hp.com and operated by Hewlett-Packard Development Company, L.P. as described above.

Turning again to FIG. 7, once the print application (327) is created (block 740), the server (115) stores the newly created print application (327) in the print application database (325). The server (115) adds (block 745) the print application (327) to the printing device's (110) favorite apps list for selection by the user (120). The favorite apps list may be displayed on the display device (435) of the printing device (110).

Figure 8:
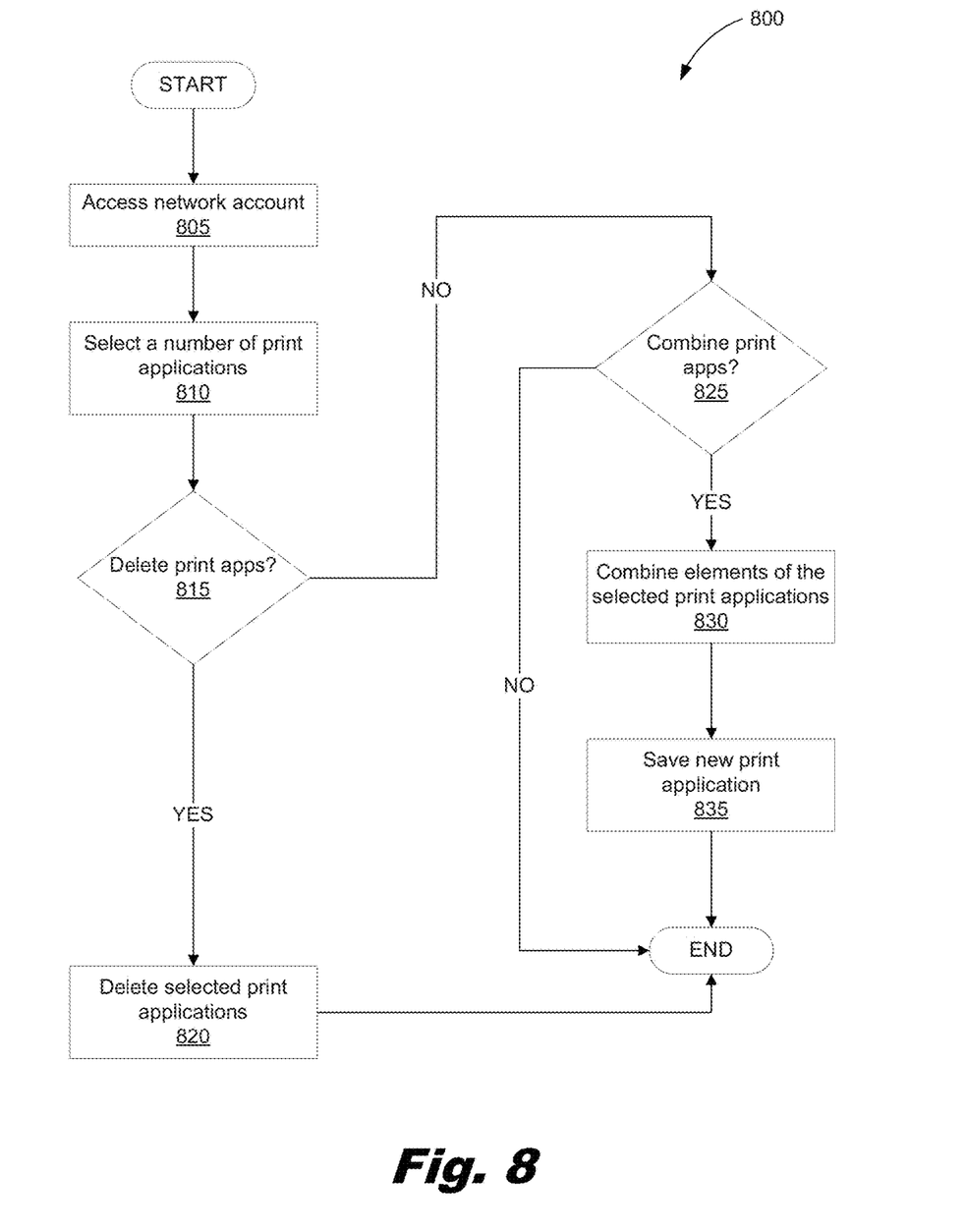
FIG. 8 is a flowchart showing a print application maintenance method, according to one example of the principles described herein.

FIG. 8 is a flowchart showing a print application maintenance method (800), according to one example of the principles described herein. Once a number of print applications (327, 329) have been created, a user (120) may wish to manage and maintain his or her print applications (327, 329) by deleting unwanted print applications (327, 329) and combining one or more print applications (327, 329). The method of FIG. 8 may begin by accessing (block 805) the network account created at block 715 of FIG. 7. The network account provides the user with access to a print application portal that lists all of the print applications (327, 329) associated with the network account and the user's (120) printing device (110). The print application portal may be accessed via the user device (105) or the printing device (110).

Once access to the print application portal has been achieved, the user may select (block 810) a number of print applications (327, 329). A determination (block 815) may be made as to whether the user would like to delete the selected print applications (327, 329). If the user wishes to delete the selected print applications (327, 329) (block 815, determination YES), then the server (115) deletes the selected print applications (327, 329).

If the user does not wish to delete the selected print applications (327, 329) (block 815, determination NO), then is it determined whether the user wants to combine the selected print applications (block 825). If the user does not wish to combine the selected print applications (block 825, determination NO), then the process terminates. If the user does wish to combine the selected print applications (block 825, determination YES), then the server (115) combines (block 830) a number of elements of the selected print applications (327, 329). In one example, the URLs of the RSS feeds of the selected print applications (327, 329) are added as different entries of the to-be-created print application. The new print application is then saved (block 835) and deployed as described above.

In one example, the appearance of print applications (327, 329) as they appear on the display (435) of the printing device (110) may be changed. For example, after the user accesses the print application portal, the user may be able to change display icons associated with the print applications (327, 329), change the order of print applications (327, 329) as displayed on the display (435) of the printing device (110), and change the classification of a number of the print applications (327, 329), among others.

The methods described above may be accomplished by a computer program product comprising a computer readable storage medium having computer usable program code embodied therewith that, when executed by the processor (205) of the user device (105), the processor (305) of the server (115), or another processing device, performs the above methods. Specifically, the computer usable program code, when executed by a processor (205, 305), causes the processor (205, 305) to append (block 505) a print application creation button (FIG. 6, 620) via the native print application (235) to a browser, receive (block 510) a single action user input from the user's device (105) instructing the addition of the content the user (120) is viewing in the browser (605) as a print application, and create (block 515) a print application in connection with the content being viewed by the user (120).

The specification and figures describe single action print application creation. The present system and methods create a print application by a single action by appending a print application creation button to a browser instance displayed on a user device, receiving a single action user input on the user device to add content displayed in the browser instance as a print application, and creating the print application based on the content. This single action print application creation may have a number of advantages, including: (1) creation of print apps on multi platforms; (2) one-click solution for print application creation; (3) end-users and consumers can create print applications; (4) print applications can be personalized and shared with public or private groups of users.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of creating a print application by a single action comprising:
   appending, by a processor of a user device, a print application creation button to a browser instance displayed on the user device, wherein the print application creation button is generated from a software application installed on the user device;
   in response to receiving a single action of a user selection of the print application creation button, capturing, by the processor of the user device, content of a webpage displayed in the browser instance; and
   transferring, by the processor of the user device, the captured content to a server for the server to create and store a print application based on the captured content, wherein, in response to an execution of the print application, the content of the webpage, from which the print application is created, is offered to a user for selection and printing.

2. The method of claim 1, further comprising installing the software application that generates the print application creation button on the user device.

3. The method of claim 1, further comprising creating a network account associated with the user device, in which the network account associates the print application with a printing device communicatively coupled to the user device.

4. The method of claim 1, further comprising capturing metadata related to the content displayed on the browser instance upon selection of the print application creation button.

5. The method of claim 4, in which the metadata related to the content comprises the universal resource locator (URL) of the webpage on which the content is published, the really simple syndication (RSS) feeds of the URL at which the content is published, metadata associated with a country utilized by the user device, and metadata associated with a language utilized by the user device.

6. The method of claim 4, wherein the metadata related to the content comprises the really simple syndication (RSS) feeds of a URL at which the content is published.

7. The method of claim 1, further comprising adding the print application to a printing device.

8. The method of claim 1, wherein the server is to manage the print application, including deleting the print application or combining the print application with other print applications.

9. The method of claim 8, in which combining print applications comprises adding URLs of RSS feeds of a number of print applications as different entries of a to-be-created print application.

10. A user device comprising:
    a processor;
    a data storage device; and
    a native print application installed on the user device to generate a print application creation button to be added to content of a webpage displayed in a browser instance,
    wherein the data storage device stores instructions that when executed by the processor cause the processor to:
       append the print application creation button generated by the native print application to the content of the webpage displayed in the browser instance executed on the user device, and
       in response to receipt of a user selection of the print application creation button, capture the content of the webpage displayed in the browser instance and transfer the captured content to a server for the server to create a print application based on the captured content of the webpage,
    wherein, in response to an execution of the print application by the processor, the content of the webpage, on which the print application is created, is offered to a user for selection and printing.

11. The user device of claim 10, wherein the instructions are further to cause the processor to capture metadata related to the content displayed on the browser instance and transmit the captured metadata to the server for the server to create the print application based on the metadata related to the content displayed in the browser instance.

12. The user device of claim 11, wherein the server stores the print application.

13. The user device of claim 10, wherein the user device is connected to a printing device for receiving the print application from the server and reproducing the content of the webpage from the print application for printing.

14. The user device of claim 10, further comprising a printing device, in which the printing device instructs the print application creator to create the print application based on the data related to the content displayed in the browser instance.

15. The user device of claim 10, wherein the print application creation button is appended to a portion of a display not associated with the browser instance.

16. The user device of claim 10, wherein the print application creation button is appended to a portion of the browser instance not associated with a control element of the browser instance.

17. A non-transitory computer readable storage medium storing instructions that, when executed by a processor, cause the processor to:

append a print application creation button to a browser instance displayed on a user device, wherein the print application creation button is generated from a software application installed on the user device;

receive a single action user input on the user device to add content from a webpage displayed in the browser instance as a print application;

create the print application based on the content; and in response to an execution of the print application, offer content from the webpage on which the print application is created, to a user for selection and printing.

18. The non-transitory computer readable storage medium of claim 17, wherein the instructions are to cause the processor to capture metadata related to the content displayed on the browser instance upon selection of the print application creation button by the user, wherein the captured metadata related to the content is transmitted to the server in extensible markup language (XML) format.

19. The non-transitory computer readable storage medium of claim 17, wherein the instructions are to cause the processor to append the print application creation button to a toolbar of the browser instance.

* * * * *